United States Patent
Kozlovski et al.

[11] Patent Number: 6,133,390
[45] Date of Patent: Oct. 17, 2000

[54] POLYMERIC MATERIALS

[76] Inventors: Mikhael Kozlovski, Kutuzovskii pr. 69 Bd. 1 Ap. 11, Moscow, Russian Federation, 121357; Kent Skarp, Bräckavägen 45, Lindome, Sweden, 437 42

[21] Appl. No.: 09/063,656

[22] Filed: Apr. 21, 1998

[51] Int. Cl.$^7$ .................................................. C08F 128/02

[52] U.S. Cl. ..................... 526/287; 526/298; 526/312; 526/325; 526/329.2; 526/329.5

[58] Field of Search .................................. 526/287, 298, 526/312, 325, 329.2, 329.5

[56] References Cited

U.S. PATENT DOCUMENTS

| | | | |
|---|---|---|---|
| 4,631,328 | 12/1986 | Ringsdorf et al. | 526/312 |
| 4,925,589 | 5/1990 | Lorenz | 526/312 |
| 4,962,160 | 10/1990 | DeMartino et al. | 526/312 |
| 5,310,837 | 5/1994 | May | 526/311 |
| 5,543,267 | 8/1996 | Stumpe et al. | 526/312 |
| 5,641,846 | 6/1997 | Bieringer et al. | 526/292.2 |

*Primary Examiner*—Bernard Lipman
*Attorney, Agent, or Firm*—Oppedahl & Larson LLP

[57] ABSTRACT

The present invention relates to a photochromic polymer for photo recording purposes comprising polymethacrylate, and having the following general formula:

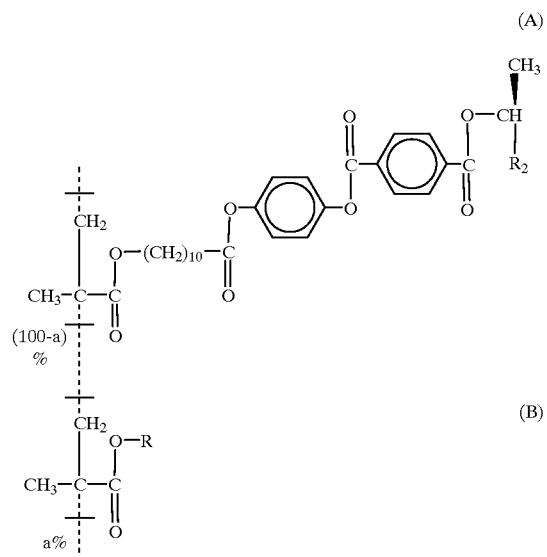

wherein R is —$(CH_2)_o$—X—$C_6H_4$—Z—$C_6H_4$—$R_1$, wherein $R_1$ is an electron acceptor, such as cyano, alkoxy having 1 to 8 carbon atoms, halosubstituted alkoxy having 1 to 8 carbon atoms, halogen (F, Cl), hydroxy, esters of the formula
—OOC—$C_nH_{2n-1}$, —CO—$C_nH_{2n-1}$, wherein n is 1 to 8, preferably 4 to 6, but excluding nitro, Br, I, and —$SO_3H$, X is selected from the group consisting of —O—, and —COO—, Z is selected from the group consisting of —N=N—, —CH=N—, or —CH=CH—, wherein —CH= of the —CH=N— group is bound to the main part of the structure, $R_2$ is $C_mH_{2m+1}$, wherein m is an integer 4 to 7, o is a number of 7 to 12, preferably 10, and a is number providing for a photo chromic polymer.

20 Claims, 13 Drawing Sheets

POLYMERIC MATERIALS

TECHNICAL FIELD

The present invention relates to photo chromic polymers comprising a polymethacrylate.

The object of the present invention is to obtain a possibility of preparing photo chromic polymers which can be initialized using visible, non-polarized light of low intensity and energy content.

BACKGROUND OF THE INVENTION

Recent years have been marked by a considerable interest in the synthesis and studies of liquid crystalline (LC) and amorphous polymers containing azo dye fragments in the side chains. Those polymers were convincingly shown to be applicable for reversible optical high density data recording and for data storage systems with optical memory [1–6].

The principle of photooptical recording is based on the activation of photochromic azo dye side branches of various homo- and copolymers under the action of the light with a certain wavelength. Those azo dye fragments undergo a series of photochemical configurational transformations (trans—cis isomerization) which cause their conformational changes: the rod-like azobenzene groups in the trans-conformation rearrange to the cis-isomers having a bent (broken) form. Such transformations lead to the local changes in orientation of not only photo chromic monomer units but also the neighbouring non-photo chromic mesogenic side groups. The probability of light absorption by photo chromic fragments is different, so the photo chromic side branches must aquire a predominant orientation due to photoselection. If polarized light is used, the azo fragments are oriented in such a way that the long axis of the dye fragments are perpendicular to the electric vector of the light (or laser illumination). This process is accompanied by the orientation of the neighbouring side groups in the amorphous polymers and the reorientation of the neighbouring mesogenic groups in the LC polymers; in other words, the cooperative orientation of photo chromic and non-photo chromic groups takes place. Thus, the light acts as a "controlled external field" permitting us to regulate the supramolecular structure of the polymer and to obtain high-oriented polymer materials at ambient temperature.

The orientation of asymmetric side fragments of amorphous and LC polymers results in a significant appearance of photoinduced birefringence, $\Delta n_{ind}$. The values of $\Delta n_{ind}$ essentially depends on the initial structural organization of the polymer matrix: the higher degree of the mesogenic groups ordering, the less values of the photoinduced birefringence, since the orientational order in the LC state most likely restricts the reorientation of side groups and, therefore, that process is probably more effective in the less ordered medium.

Up to date mainly nematic and smectic photo chromic azo dye containing copolymers have been used for photo optical investigations [1–9].

Previously known photo optic polymers are generally of the type of highly viscous liquids and require a covering glass to be able to be used after the polymers (viscous liquid) have been orientated. This is a great disadvantage as there is no mechanical strength at all present in the polymers.

DESCRIPTION OF THE PRESENT INVENTION

Figure 1A:
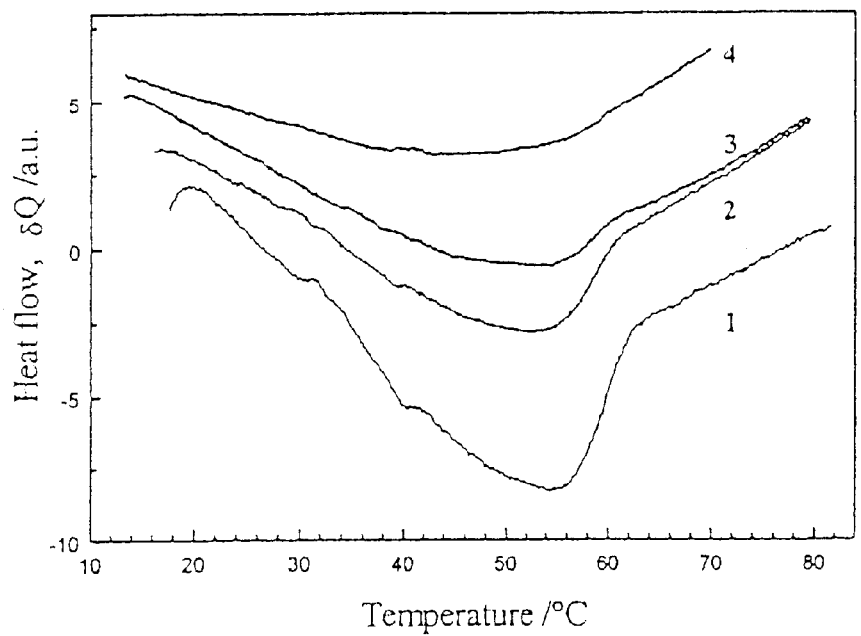
FIGS. 1A and 1B show DSC curves for copolymer SK-8 in heating (A) and in cooling (B) at 10 K/min (1), 5 K/min (2), 2.5 K/min (3) and 1.25 K/min (4).

In this work the main attention has been focussed on the synthesis, structure, and photo optical study of the chiral photo chromic copolymers consisting of the chiral phenyl benzoate mesogenic side groups and photo chromic azobenzene, Schiffs base, benzene, and stilbene dye fragments linked to the main chain via aliphatic spacers of equal length. The general formula of the copolymers are as follows:

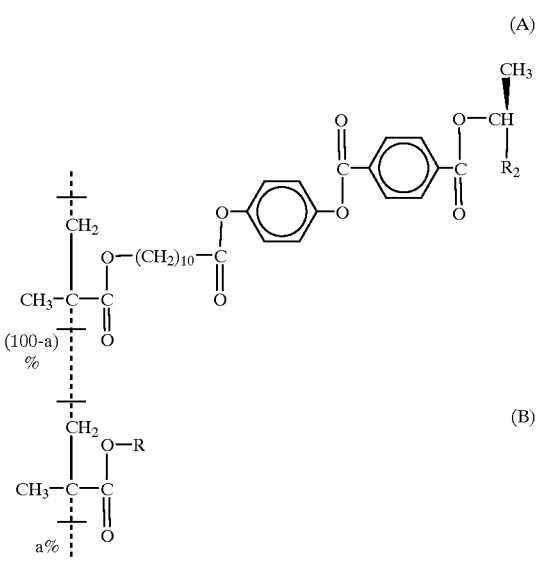

wherein R is —$(CH_2)_o$—X—$C_6H_4$—Z—$C_6H_4$—$R_1$,
wherein $R_1$ is an electron acceptor, such as cyano, alkoxy having 1 to 8 carbon atoms, halosubstituted alkoxy having 1 to 8 carbon atoms, halogen (F, Cl), hydroxy, esters of the formula —OOC—$C_nH_{2n-1}$, —CO—$C_nH_{2n-1}$, wherein n is 1 to 8, preferably 4 to 6, but excluding nitro, Br, I, and —$SO_3H$, X is selected from the group consisting of —O—, and —COO—, Z is selected from the group consiting of —N=N—, —CH=N—, or —CH=CH—, wherein —CH=of the —CH=N— group is bound to the main part of the structure, $R_2$ is $C_mH_{2m+1}$, wherein m is an integer 4 to 7, o is a number of 7 to 12, preferably 10, and a is number providing for a photo chromic polymer.

Alkoxy groups are methoxy, ethoxy, propoxy, isopropoxy, n-butoxy, tert.-butoxy, isobutoxy, pentoxy, hexoxy, heptoxy and octoxy, preferably methoxy, ethoxy.

Halosubstituted alkoxy groups are such as trifluoromethoxy, trichloromethoxy, difluoroethoxy, dichloroethoxy.

The photo chromic monomer is present in an amount which relates to the structure of the monomer, and thus the azobenzene fragment containing a cyano group is effective in amounts of 6 to 20 mol %, the methoxy equivalent is effective when present in an amount of about 40 mol % and more, and thus it is contemplated a molar percentage of 35 to 80, with regard to alkoxy groups in an azo photo chromic dye fragment.

However, the structure of the group Z in the structure of the nonchiral comonomer mesogenic unit R in the general formula above, does not seem to influence much on the proportion of nonchiral component that can be introduced to the P8*M matrix without destroying the "isotropic smectic phase". Thus it is possible to introduce 30% of the methoxy azobenzene groups (Z being —N=N—; $R_1$ being —$OCH_3$), and 47% of the hexylbenzoate groups (X being —COO—; $R_1$ being —$OC_6H_{13}$). The dipole moment of the group seems to be much more important: "the isotropic smectic" matrix can tolerate e.g only 16% of the cyano azobenzene groups (dipole moment of the cyano group is about 4.5 D as compared with 0.5 D for the methoxy group), which indicates that any substituent $R_1$ having a dipole moment exceeding about 5D should be avoided.

There are three aspects that make this copolymer especially attractive. First of all, these copolymers are new representatives of chiral photo chromic polymers. The study of those is of a great interest from the structural and photooptical points of view. We should note that the number of the chiral photochromic polymers described in the literature is limited only to a few examples [10].

Secondly, the chiral homopolymer (A) forms the unusual "isotropic smectic phase" described recently in [11,12] in the framework of a $TGB_A$-like structure. The isotropic character of that mesophase could predetermine the easy orientation of the mesogenic fragments of the copolymers under the action of light irradiation according to the data mentioned above and in the ref. [5] as well.

Having in mind that the elucidation of the relationship "molecular structure—optical properties—photooptical behaviour" for chiral photochromic polymers practically does not exist up to date, we associate the goal of the present publication and future work in that field with the synthesis of new type of chiral photo chromic illumination control (IC) polymers and systematic study of their thermal and structural data as well as photooptical behaviour.

Thirdly, the present copolymers are forming tough, elastic, flexible polymers, that can be cast, rolled or otherwise treated to give a film having the photo optic recording properties mentioned.

Synthesis of monomers and copolymerization

The chiral methacrylic comonomer (A) was synthesized according to the method described in [11]. Synthesis of the methacrylate with the 4-cyanoazobenzene group, i.e. monomer (B), was obtained according to the method reported earlier [13].

Copolymerisation of the corresponding methacrylic monomers was carried out in dry benzene (10% solution) during 72 h at 60° C. using AIBN as initiator (0.1 wt %). The 0.3 g copolymer batch was reprecipitated 3 times from chloroform to methanol and washed several times by 50 ml of boiling methanol. During the present synthesis a copolymer containing 8 mol % of (B) was prepared.

The composition of the copolymer has been assumed to be equal to that one of the monomer mixture due to almost identical chemical structure of the comonomers. In the present paper, the properties, structure, and photooptical behaviour are presented for the copolymer of the photochromic monomer B.

Methods

DSC curves were taken with a Perkin-Elmer DSC-2C calorimeter at various heating/cooling rates from 1.25 to 10 K/min. The temperatures of phase transitions reported below are the values reduced to zero cooling rates.

Microscopic textures were observed under a Leitz microscope supplied with a Mettler FP-82 heating stage and a videorecording system.

X-ray scattering curves were measured from 2 mm capillary samples by a modified STOE STADI 2 diffractometer using $CuK_\alpha$ radiation and PSD linear position scanning detector [14]. For evaluation of the peak maxima, the curves were fitted with the splitted Pearson VII function (small angle range) and Lorentz function (wide angle range).

VIS spectra and linear dichroism of the copolymers were studied using Cary 17 and Hitachi U3400 spectrophotometers. Cirular dichroism curves were taken with a JASCO 500C spectropolarimeter from a 6 μm thick polymer film.

The photorecording was made with light of a 60 W incandescent lamp or 11 W saving lamp of the same light flux from ~10 cm distance. The SZS-2 1 and FS-6 colour glass filters were used for selective irradiation within the wavelengthe ranges 400–500 nm and 300–400 nm, respectively. To estimate the illumination intensity used for the photorecording, the Melles Griot broadband power/energy meter 13PEM001 has been used.

Before considering the phase behaviour of the chiral photochromic copolymer synthesized in the present work, it shall be noted the structural parameters of the corresponding homopolymers—the chiral homopolymer (A) and the azobenzene homopolymer (B). Phase transitions of the homopolymers are summaritzed in Table 1. The homopolymer B (named CABO-10-OM in Ref. [13]) forms below clearing point the standard Sm A phase which is frozen in glass at room temperature. At the same time, for the homopolymer A (named P8*M in Ref. [11]) the DSC, X-ray, and broad line PMR data give evidence of a phase transition at 64° C. and indicate a layered smectic structure below that temperature, but no optical birefringence has been observed. Later, a $TGB_A$-like structure with extremely short helical pitch (less than the wavelength range of visible light) has been suggested for that "isotropic smectic phase" [12].

TABLE 1

Phase transitions of the homopolymers

| Homopolymer | $M_w$ | $M_w/M_n$ | Phase Transitions, ° C. | Layer thickness, d, Å | Ref. |
| --- | --- | --- | --- | --- | --- |
| (A) | 99,000 | 2.7 | g 30 $TGB_A$-like 64 Iso | 63.3 | [11,12] |
| (B) | 23,200 | 4.3 | g 35 Sm A 161 Iso | 43.0 | [13] |

Phase behaviour and structural features of the copolymer having 8 mol % of (B) (SK8)

Figure 1B:
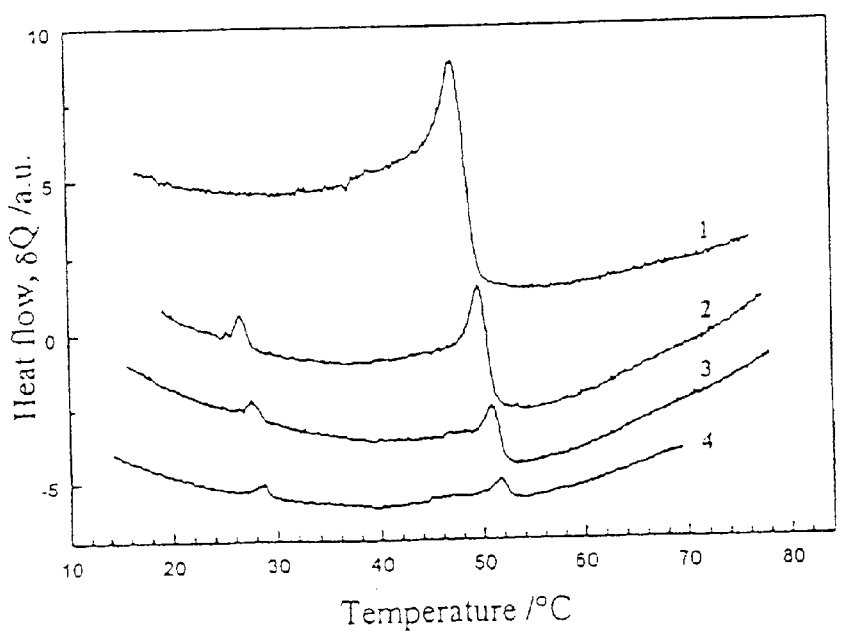

The DSC curves of the copolymer show only one broad peak in heating, but the shape of the corresponding curves in cooling depends on cooling rate (FIGS. 1A and 1B). As seen from the FIG. 1A, only one peak is observed at fast cooling down to room temperature. When the cooling rate is lower than 5 K/min, preferably lower than 4° K./min, a second peak appears (FIG. 1B).

The DSC data are supported by visual observations and X-ray measurements. When the copolymer is being cooled fast from isotropic melt, no visual changes occur, and the resulting texture appears at room temperature as uniform, highly transparent, optically isotropic and showing neither birefringence nor visible light scattering. However, the X-ray diffraction pattern from that phase (FIG. 2, curve 1) gives evidence of a layer structure: three peaks at small angle range correspond to a single lattice with the period $d_0$~65 Å which is close to the value for the $TGB_A$-like phase of the homopolymer (A). Therefore, the same $TGB_A$-like structure has been suggested for the "isotropic smectic phase" of the copolymer SK8.

When the copolymer having 8 mol % of (B) is cooled slowly (at 2.5 K/min or less), the phase transition occurs at ~30° C., and the polymer sample appears at ambient temperature as a turbid, high-scattering confocal texture typical for proper smectics. The X-ray scattering curve from the latter phase (FIG. 2, curve 2) shows a picture similar to the former one, but the first scattering peak is much better resolved and the corresponding interlayer distance is somewhat higher, $d_0$~67 Å. (For both X-ray curves, the second order reflex $d_1=d_0/2$ is more intensive than the first one, probably due to particular distribution of the electron density along the mesogenic side chain, as it has been suggested for other IC polymers with phenyl benzoate side chains [16, 17]).

The "proper smectic phase" of the copolymer, as obtained by slow cooling below 30° C., shows no ferroelectric switching, and the $d_0$ value estimated from the series of small angle scattering peaks shows no prominent temperature dependence, thus indicating an orthogonal smectic structure. The broad peak of the wide angle X-ray scattering of the mesophase is typical for disordered smectic phases. We can suggest therefore the Sm A* structure for the low temperature "proper smectic" mesophase of the copolymer having 8 mol % of (B).

Figure 3A:
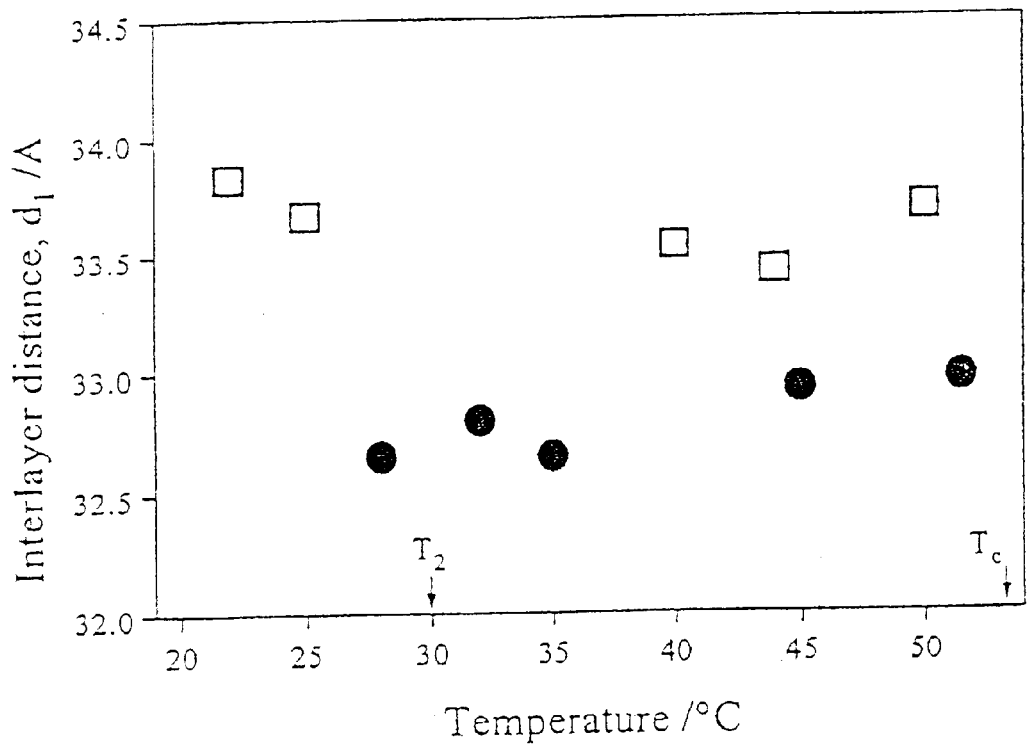
FIGS. 3A and 3B show the positions of small angle peak of maximum intensity, $d_1$, (A) and of the wide angle peak, D, (B) for SK8, in the TGB $A^*$ phase (open squares) and i the SM $A^*$ phase (closed circles), both versus temperature.
Figure 3B:
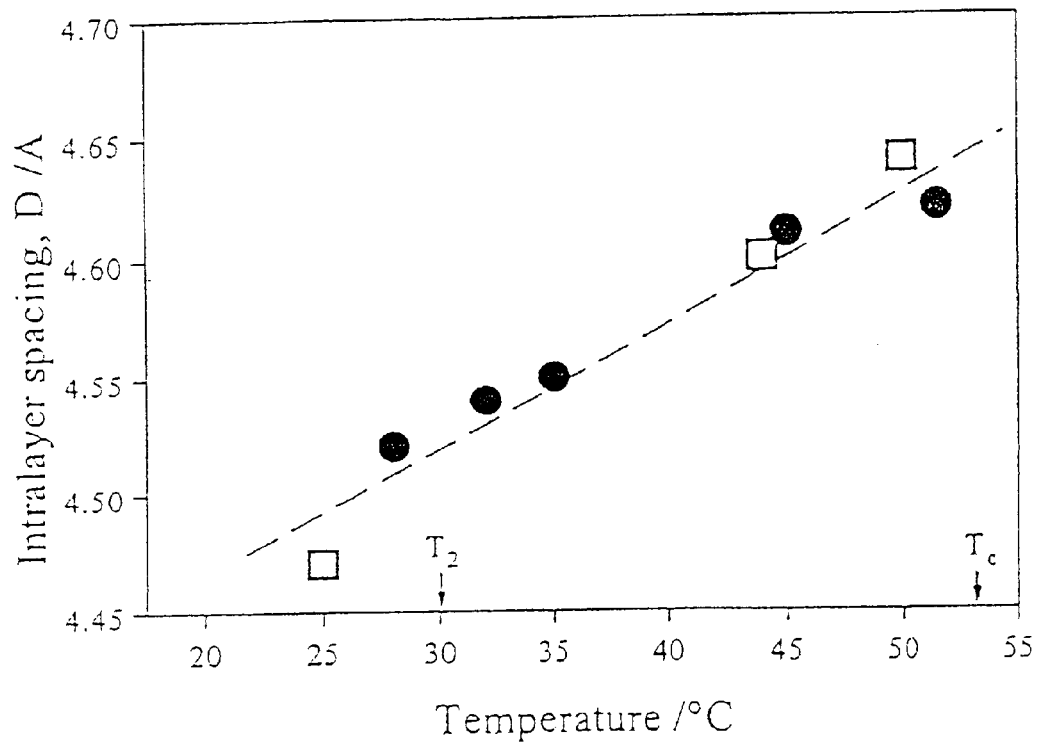

FIG. 3A presents the layer spacing $d_1=d_0/2$, estimated from the second X-ray peak of maximum intensity, versus temperature; and FIG. 3B shows the temperature dependence of the distance between neighbouring side chains within the layer, D, measured from the wide angle peak. We should remind here once again, that a copolymer sample can appear at any temperature below the clearing point $T_C$=53.3° C. in the "isotropic smectic phase" (when heated from the $TGB_A$-like amorphous glass), as well as in the proper smectic phase (when heated from the Sm A* glass).

As seen from FIG. 3A, the $d_1$ value for either mesophase remains practically constant over temperature, but the 1.5 Å difference between the $d_1$ values for the two mesophases is statistically significant and out of the experimental error. On the other hand, the D values follow the same straight line for both mesophases. We can therefore conclude, that the "isotropic smectic phase" and the Sm A* phase of the polymer differ in ordering of smectic layers but not in the ordering of side chains within the layers.

Figure 4A:
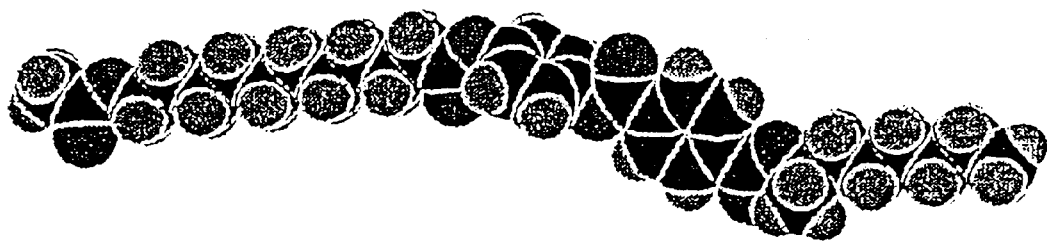
FIGS. 4A and 4B show molecular models for the chiral mesogenic side chains (A) and the azobenzene dye side chains (B) in the most elongated conformations.
Figure 4B:
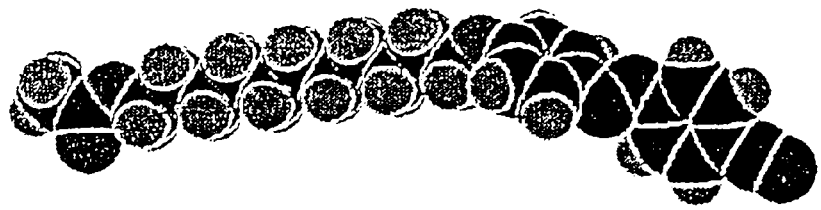

FIGS. 4A and 4B present the molecular models for the chiral mesogenic side chains (A) and the azobenzene dye side chains (B) in the most elongated comformations. The thickness of smectic layers for SK8 copolymer is between the single and double length of the chiral side chain (A), 1~39.5 Å, but it should not be influenced much by the shorter dye mesogenic chains (B), 1~29.5 Å, due to small concentration of the latter.

Figure 5B:
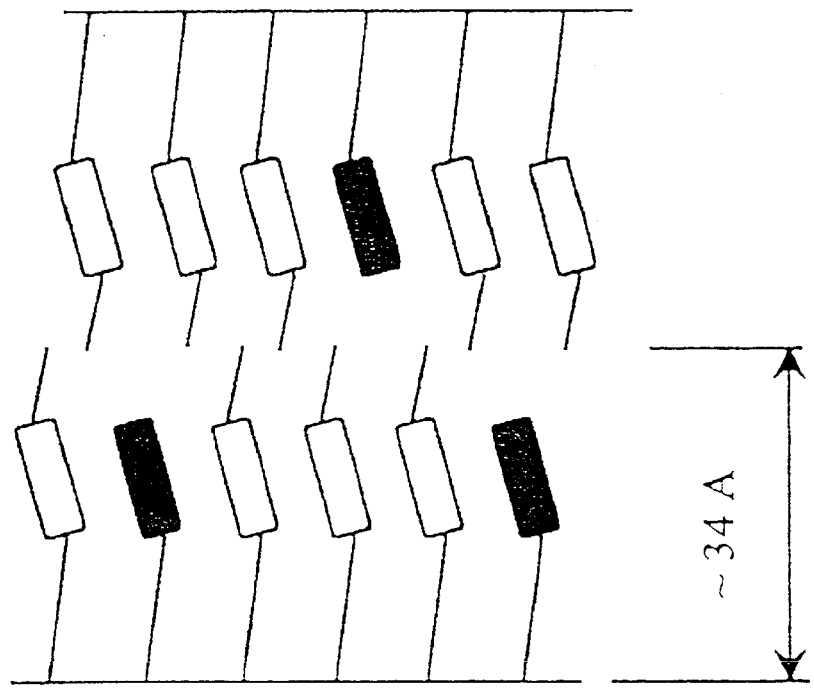
FIGS. 5A and 5B show proposed local packing of mesogenic groups in smectic layers.

The only reasonable structure of the mesophase layer should include mutual penetration of the chiral terminal groups of the side chains (FIGS. 5A and 5B), similar to the layer packing suggested for the homopolymer (A) [11]. The overlapping is somewhat deeper in the proper $S_A$* phase ($d_0$~65 Å) than in the $TGB_A$-like phase ($d_0$~67 Å). FIG. 6 summarizes the proposed scheme of the phase transitions for the copolymer: the monotropic $TGB_A$-like phase formed in cooling from the true liquid phase (above 53.3° C.) can be frozen in glass, before the $TGB_A$-like to Sm A* phase transition occurs, if the cooling is fast enough.

Optical properties and photosensitivity of the copolymer having 8 mol % of (B) (SK8)

The copolymer having 8 mol % of (B) contains a small part of azobenzene dye moieties which are capable to the photo induced cis-trans isomerization. The absorption spectra of the polymer (FIGS. 7A and 7B) shows two absorption bands within the wavelength range of visible light, namely at 360 nm and 450 nm, which should correspond to the trans and cis isomers correspondingly [5]. The a spectra of the thin polymer film (FIG. 7B) show practically no difference in absorption between the "isotropic smectic phase" at room temperature and the proper isotropic liquid phase above the clearing point.

The helically twisted $TGB_A$-like phase should possess circular dichroism. Indeed, the CD spectra of the copolymer film (FIG. 8) show prominent rotation of the polarization plane with the maximum value of rotating power above $0.1°/\mu m$ at the dye absorption band $\lambda_{max}$~430 nm. That is less than the values reported for cholesteric phase of IC polymers but much higher than the optical rotation induced by molecular chirality in centrosymmetric IC phases [20]. From the sign inversion point at the spectra, $\lambda_0$~380 nm, the helical pitch can be estimated as $p=\lambda_0/n$~250 nm, that is close to the values evaluated for the "isotropic smectic phase" of other homo- and copolymers within the range 200–280 nm, [21, 22].

Figure 9:
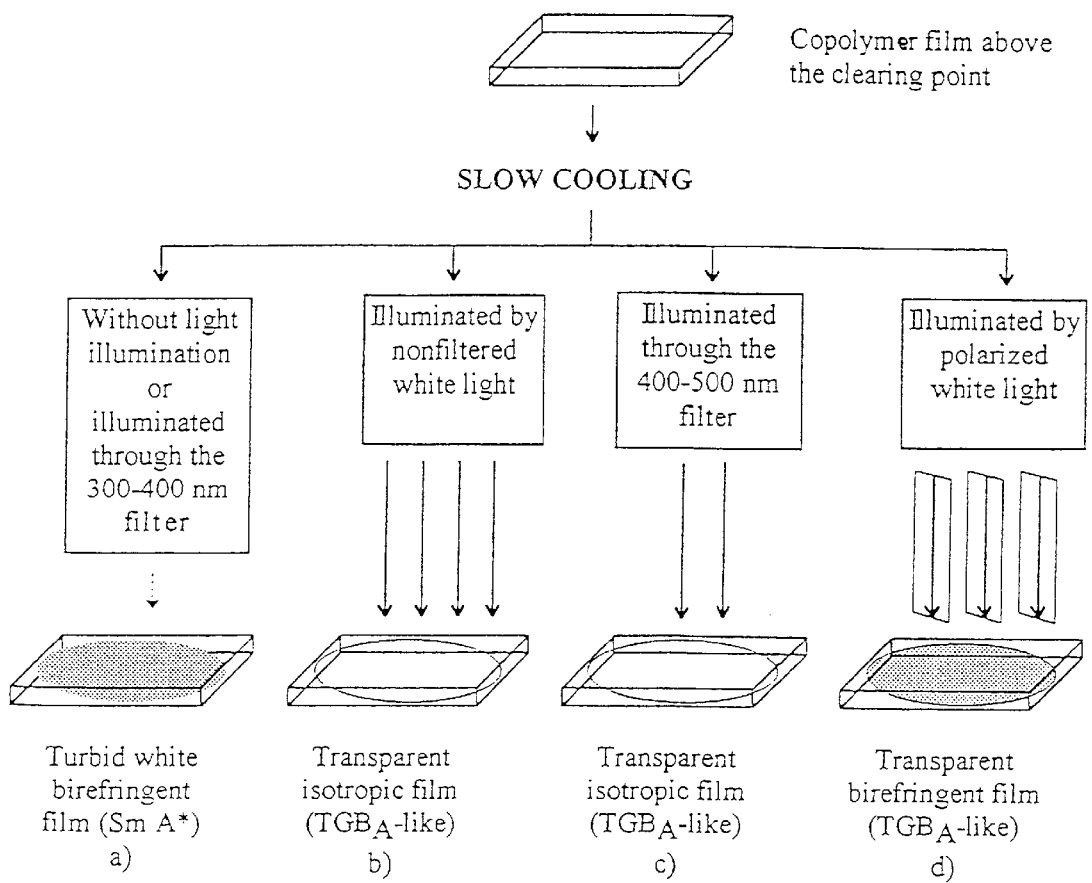
FIG. 9 is a sketch of the structural transformations under cooling and irradiation by light.

It has been found that the illumination of the polymer film during the slow cooling hinders the phase transition from $TGB_A$-like phase to Sm A* phase. FIG. 9 presents a sketch of various photosensitivity tests carried out. The phase transition can be prevented either by unfiltered white light of total intensity 11 mW/cm² within the wavelength range 200–2000 nm (b) or selectively by illumination of the intensity to 0.3 mW/cm² within the 400–500 nm wavelength range (c), while the excitation at the other absorption band (within the 300–400 nm wavelength range) does not disturb the phase transition at 30° C. (a). If the irradiating light is polarized (d), the orientation of chromophores takes place. As a result, the irradiated polymer film remains completely transparent and does not scatter light but shows prominent birefrigence. Such a film polarizes itself the propagating light.

Figure 8:
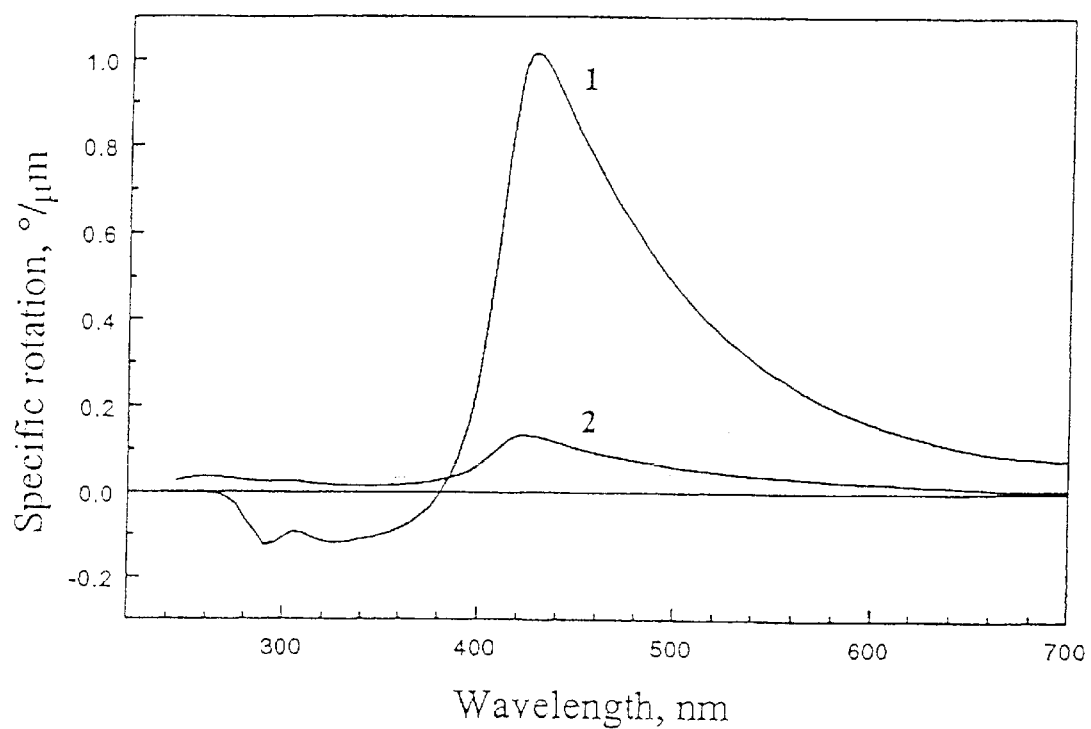
FIG. 8 shows CD spectra from the 6 μm thick copolymer films at room temperature: 1-SK8, TGB $A^*$ phase; 2-SK16, Sm $A^*$ phase that agrees with the helical pitch estimations for TGB $A^*$ phase of other homo- and copolymers ~200–280 nm [3A, 7A]. The molecular rotation and the rotation due to helical superstructure seem to have the same sign at the yellow-red wavelength range ($\lambda > \lambda_0$), but they are acting in the opposite directions at the violet-blue part of the spectra ($\lambda < \lambda_0$), and this should cause a small maximum (towards positive values) at 310 nm related to the second absorption band of the dye.
Figure 10:
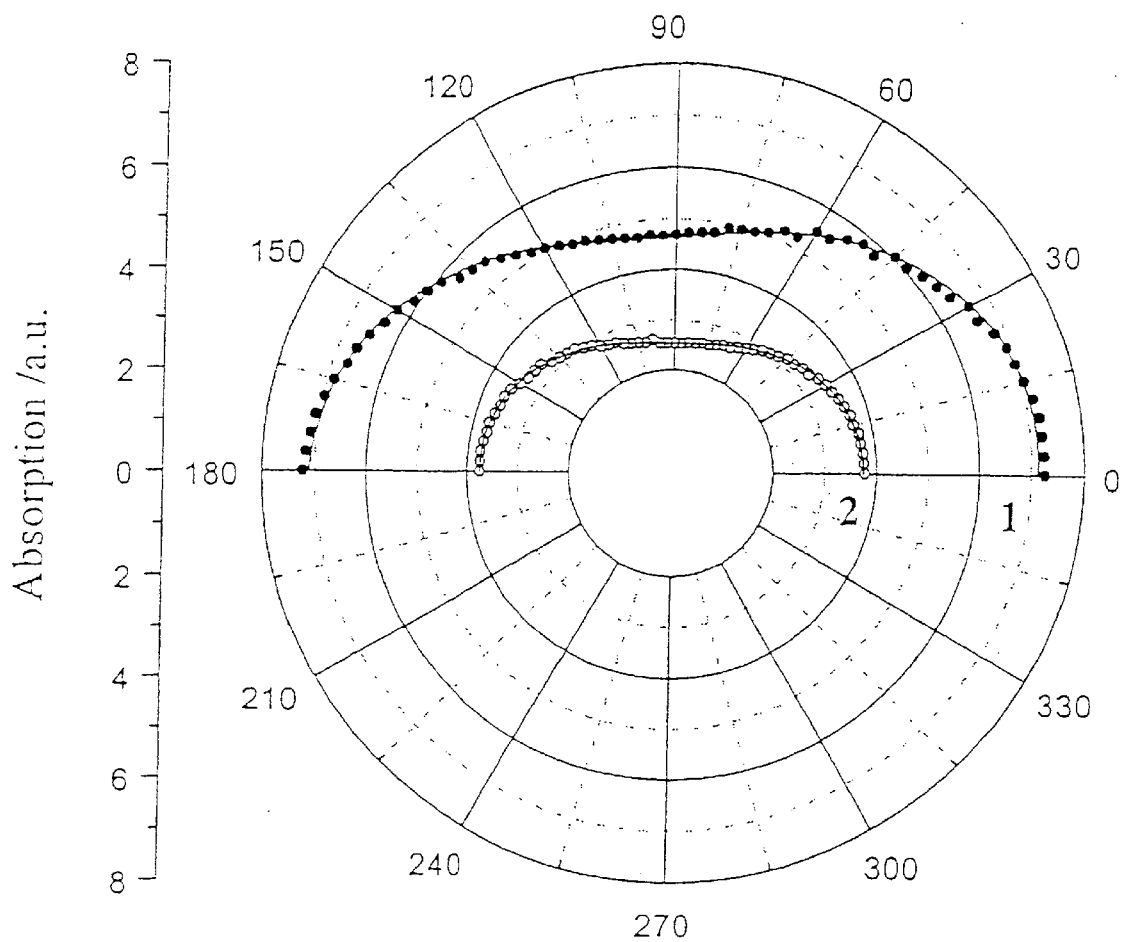
FIG. 10 shows the absorption of the polymer film (test d in FIG. 9) versus the polarization angle at 460 nm (1) and 500 nm (2)-experimental points and fitting curves.
Figure 11:
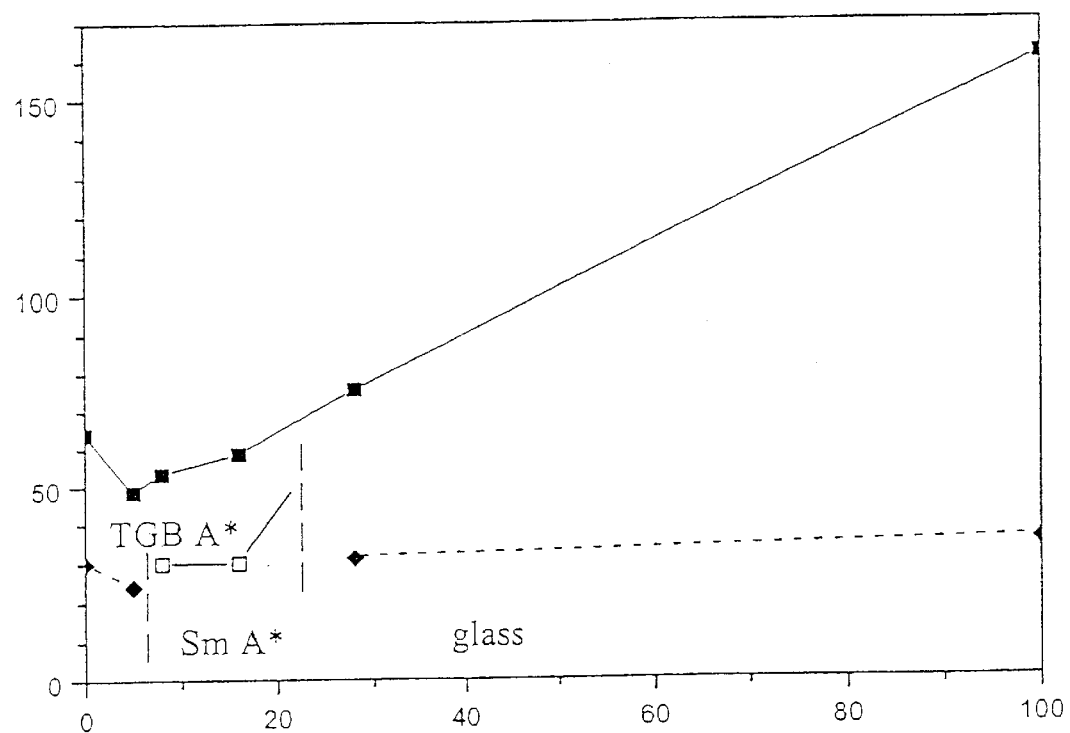
FIG. 11 is a phase diagram of the copolymer system SKn (in slow cooling).

FIG. 10 presents the absorption of polarized light by the polymer film prepared in such a way (test d in FIG. 9) versus the polarization angle (the film has been first cooled at 2 K/min under irradiation by polarized light). Two measurements have been made: close to the second absorption band at $\lambda=460$ nm and out of that band, at $\lambda=500$ nm. As seen from the Fig., the linear dichroism is much better developed in the vicinity of the absorption band, the same as observed for the circular dichroism (FIG. 8). The data of FIG. 10 were fitted as $$A = A_{//} \cos^2(\theta-\theta_0) + A_\perp \sin^2(\theta-\theta_0)$$

where A is total absorption, $A_{//}$ and $A_\perp$ are the light absorption components in plane of maximal absorption and normal to that plane, and θ is polarization angle. The order parameter of the chromophore groups was estimated as $$S = \frac{A_{//} - A_\perp}{A_{//} + 2A_\perp}$$

The S values calculated for both wavelengths are almost the same: $S_{500}$~0.14 and $S_{460}$~0.15. Such small S values also confirm the TGB-like phase state of the irradiated film but not an oriented monodomain Sm A structure.

The hindering of the phase transition from the $TGB_A$-like phase to Sm A* by light irradiation could be explained by the following considerations. The light illumination (either by white light or within the 400–500 nm wavelength range) changes the proportion of cis- and trans-conformers of the azo dye moieties. Excess of a conformer (probably the trans one) could prevent the phase transition from $TGB_A$-like phase to Sm A* phase due to steric factors or because of difference in induced chirality. It is previously shown a higher chirality of the trans-conformer of low molar mass chiral azo dye, as compared with the cis-conformer [23]. Absence of the effect when illuminating within the wavelength range 300–400 nm can be explained either by preferable formation of the cis-conformer, or by the small intensity of the irradiating light within that wavelength range and/or by the absorption of the light only within a thin surface layer (less than 1 μm), since the extinction of the dye at that band is much higher.

An alternative explanation of the effect observed would consist in a shift of the phase transition point towards lower temperatures, as reported for the N—Iso transition in a photosensitive polyacrylate with azobenzene side chains [10], so that the glass is being formed first.

The observed effect can be used for the photorecording purposes. shows the simplest photorecording set-up. The polymer sample is simply pressed between two glasses on the surface of a heating stage at 70° C. Then the negative mask is put above, the standard incandescent lamp switched on, and the heater switched off. After the sample is cooled down to room temperature (0.5 h), the illumination can be stopped and the image has been recorded.

According to the abovementioned scheme of phase transitions (FIG. 6), the Sm A* phase is formed in the shadow under the mask. It scatters strongly the incident light and looks out as white one. At the same time, the proper smectic phase is not formed in the illuminated parts of the cell and the $TGB_A$-like phase is being frozen in glass. In other words, the written image is realized as a result of the strong light scattering by the smectic A phase appearance on the background of transparent glassy "isotropic smectic" phase. An example of a photorecorded image with the name of one of the inventors was prepared. The written image shows good stability: up to date, it is kept 7 months at room temperature with no visible changes.

The "isotropic smectic phase" combines high transparency and low scattering without any pre-orientation of the sample, typical for amorphous polymers, with the local smectic ordering and twisted helical structure of the TGB phase. That might be an advantage for applications in opto-electronics and photorecording. In course of our search for enhanced photosensitive materials we have synthesized a series of dye doped copolymers Skn, wherein n denotes the mol % of (B),

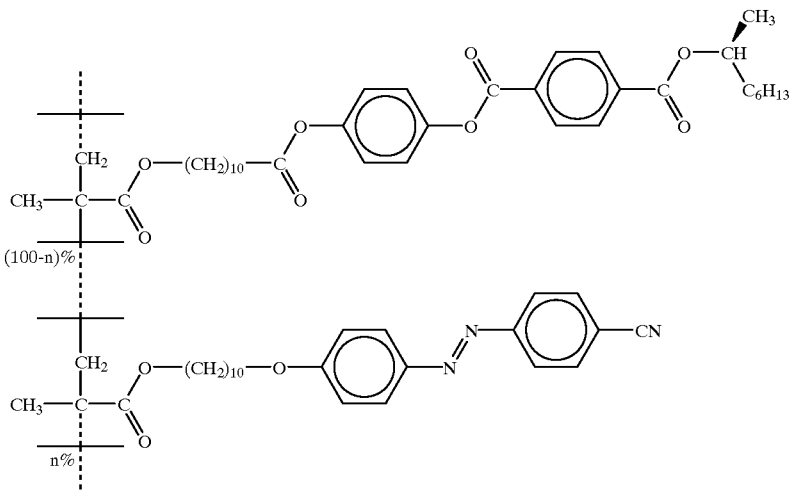

where n=5, 8, 16, and 28, is concentration of the dichromic azobenzene side chains (mol. %).

Below, phase behaviour, structure and optical properties of the copolymers are reported.

EXAMPLES 3–5

Synthesis of the copolymer SK8 has been already given above. All other copolymers were synthesized according to the same scheme by radical polymerization in toluene solution using AIBN as initiator. The composition of the copolymers has been assumed to be equal to that one of the monomer mixtures due to almost identical chemical structure of the comonomers.

Molar mass of the copolymers have been measured by WATERS WISP 712 using polystyrene as a standard, thereby it has been estimated having a Mw of about 1.5–2× $10^5$, with Mw/Mn being 2.9 to 4.5.

DSC curves were taken with a Perkin-Elmer DSC-2C calorimeter at various heating/cooling rates from 1.25 to 20 K/min. The temperatures of phase transitions reported below are the values reduced to zero heating/cooling rates. Microscopic textures were observed under a Leitz microscope supplied with a Mettler FP-82 heating stage and a videorecording system. X-ray scattering curves were measured from 2 mm capillary samples by a modified STOE STADI 2 diffractometer using $CuK_\alpha$ radiation and a PSD linear position scanning detector.

Absorption spectra of the copolymers were studied using a Hitachi U3400 spectrophotometer. Chirular dichroism curves were taken with a JASCO 500C spectropolarimeter.

Phase transitions of the copolymers, as detected by DSC measurements and supported by X-ray data and microscopic observations, are summarized in FIG. 1A and in Table 1A. The SK5 copolymer with the smallest content of azobenzene dye side chains forms only the "isotropic smectic" TGB-like mesophase similar to the chiral homopolymer SK0 (named P8*M in our previous publication [21]).

TABLE 1A

Phase transitions of the copolymers SKn

| Copolymer | Phase transitions, ° C. |
|---|---|
| SK5 | glass ⇌²⁴ TGBA* ⇌ 57.4 / 48.5 Iso |
| SK8 | Sm A*glass ⇌ Sm A* →⁶² Iso; (slow) ↘ 29.9 / 53.3 ↗; TGB A*glass ⇌(fast) TGB A* |
| SK16 | Sm A*glass ⇌ Sm A* →⁶³ Iso; (slow) ↘ 29.0 / 58.5 ↗; TGB A*glass ⇌(fast) TGB A* |
| SK28 | glass ⇌²⁸ Sm A* ⇌ 85.7 / 75.7 Iso |

The mesophase appears as a transparent coloured (red-orange) plastic and shows no birefringence within the wavelength range of visible light. On the other hand, the SK28 copolymer with the highest proportion of dye moieties forms the Sm A* phase similar to the azo dye homopolymer SK100 (named CABO-10-OM in our previous publication [13]).

Figure 12:
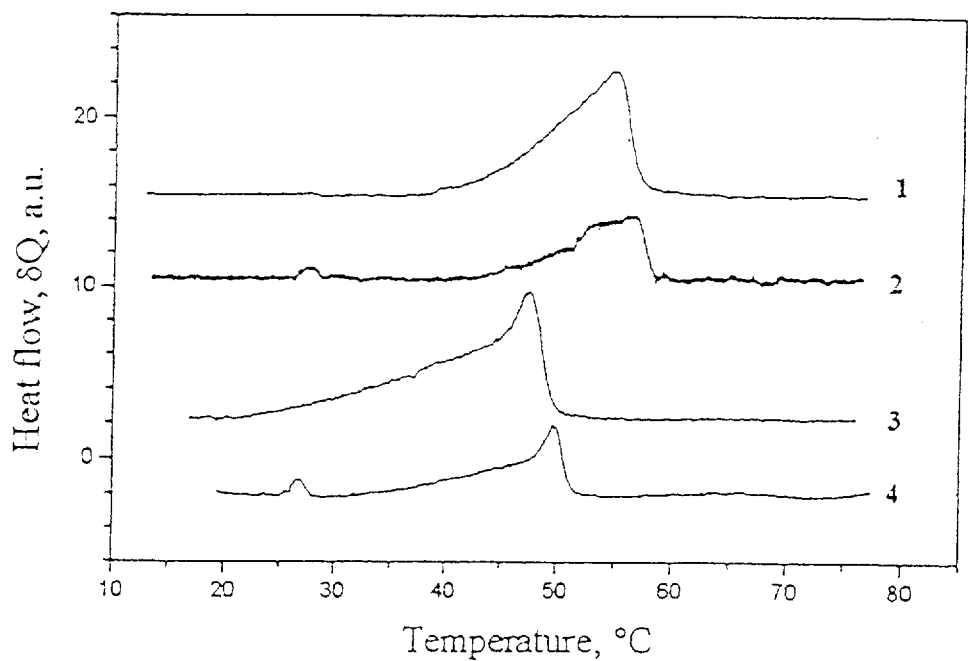
FIG. 12 shows DSC curves from the copolymers, in cooling: 1-SK16, at 5 k/min; 2-SK16, at 1.25 K/min, 3-SK8, at 10 K/min, 4-SK8, at 5 K/min.

Of the most interest is however the ambiguous phase behaviour of the copolymers SK8 and SK16. When cooled from the isotropic liquid melt, they form first the (monotropic) highly twisted TGB-like phase similar to SK5, but the further phase behaviour depends on the cooling rate. When the cooling is being performed fast (10 K/min and faster), the TGB structure is frozen in glass. Starting from a critical cooling rate (5 K/min for SK8 and 2.5 K/min for SK16), the TGB A*—Sm A* phase transition occurs, and it is the Sm A* structure that is frozen in glass in that case (FIG. 12). When heated back from either glass, the texture and phase state of the copolymers remains undisturbed until the clearing point (Table 1A). So the two copolymers can appear at any temperature below the clearing point either as a transparent isotropic texture, or as a high-scattering, birefringent confocal texture.

TABLE 2A

Positions of the X-ray peaks for the copolymers at room temp.

| Copolymer | Mesophase | $d_0$, Å | $d_1$, Å | $d_2$, Å | D, Å |
|---|---|---|---|---|---|
| SK5 | TGB A* | ~67 | 33.2 | 21.2 | 4.50 |
| SK8 | TGB A* | ~67 | 34.0 | 21.1 | 4.49 |
|  | Sm A* | ~65 | 32.5 | 21.3 | 4.47 |
| SK16 | TGB A* | ~67 | 34.6 | 21.5 | 4.48 |
|  | Sm A* | ~66 | 33.8 | 21.0 | 4.46 |
| SK28 | Sm A* | — | 34.8 | 20.8 | 4.49 |

Figure 2:
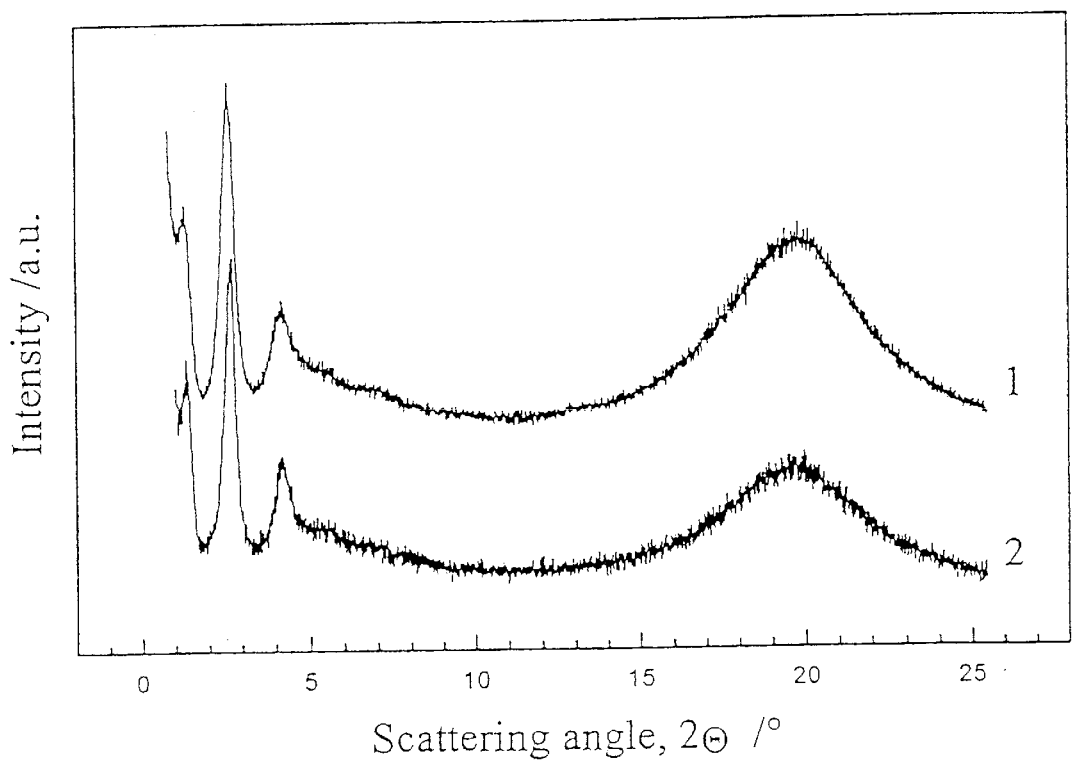
FIG. 2 shows X-ray curves of SK8 at room temperature for the polymer samples of different prehistory: (1) the TGB $A^*$ phase, (2) thee Sm $A^*$ phase.
Figure 13:
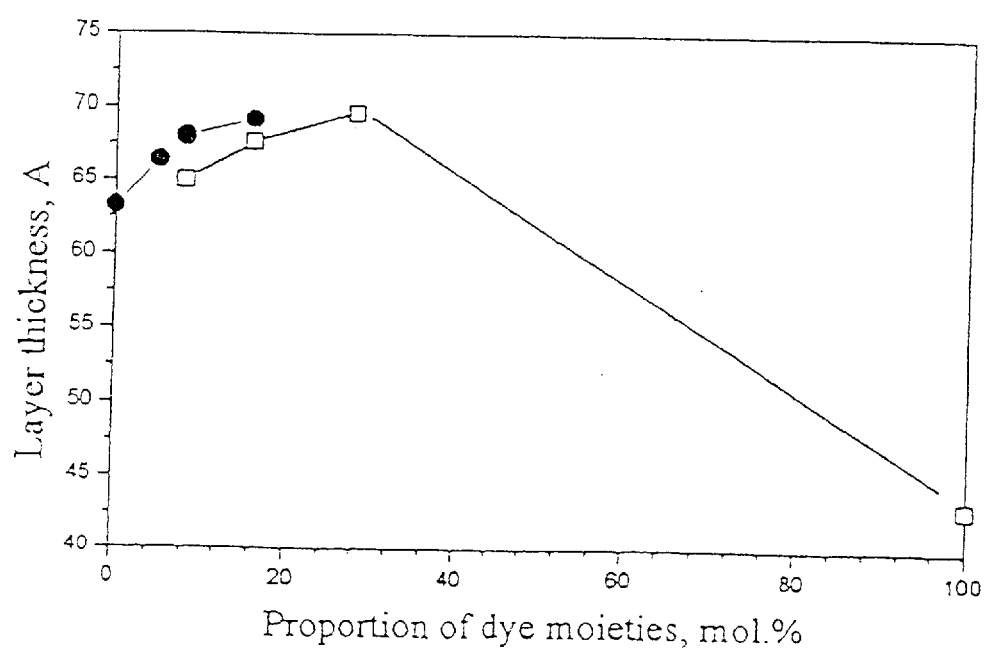
FIG. 13 shows layer thickness of the copolymers SKn in the TGB.

FIG. 2 shows typical X-ray curves from the both copolymer mesophases for the particular case of the copolymer SKI 6, and Table 2A summarizes the positions of X-ray peaks for the copolymers in different mesophases. Data of the FIG. 2 indicate a layered smectic structure for both mesophases of the copolymers (small angle range), and the disordered distribution of the mesogenic side chains within the layers as well (a broad wide angle peak). The three small angle peaks correspond to a single lattice with a period of $d_0$~67 Å for the TGB A* phase, whereas the Sm A* phase is characterised by a somewhat shorter layer thickness ($d_0$~65 Å for SK8). Changes in the interlayer distance upon the copolymer composition are presented in FIG. 13, and FIGS. 3A and 3B show the position of the small angle peak of maximum intensity, dl, and that one of the wide angle peak, D, for SK8, versus temperature. The orthogonal smectic structure of both mesophases has been confirmed by almost constant $d_1$ values.

The thickness of smectic layers for the copolymers SK5 and SK16 is between the single and double length of the chiral phenyl benzoate side chain, 1~40 Å, but it should not be influenced much by the shorter azobenzene mesogenic chains, 1~30 Å, due to the small concentration of the latter. The only reasonable structure of the mesophase layer should include mutual penetration of the chiral terminal groups of the side chains (FIG. 6A), similar to the layer packing suggested for the homopolymer SK0 [21].

Figure 5A:
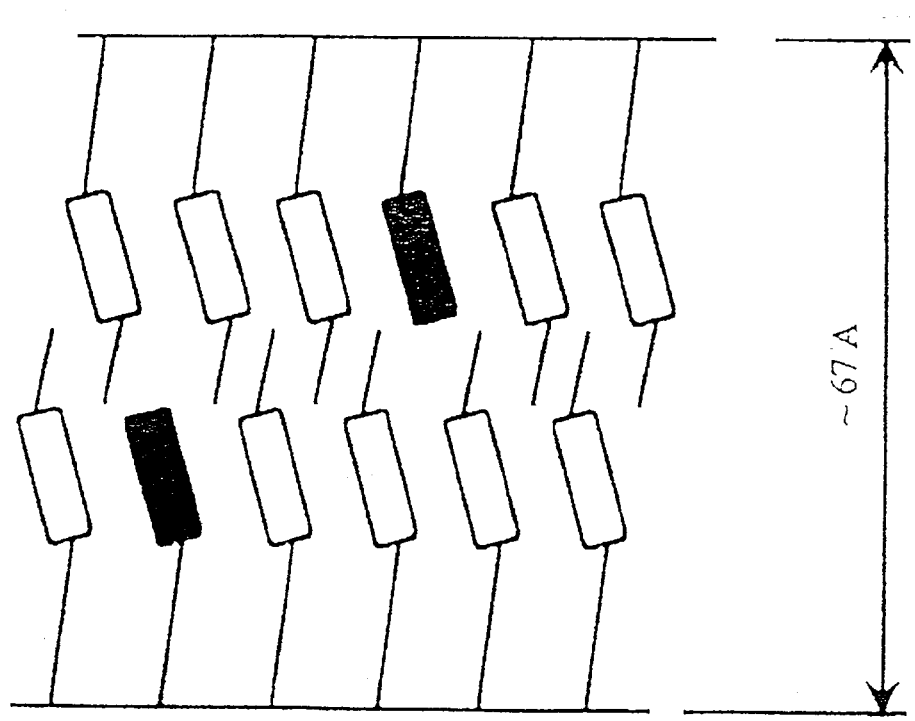
Figure 6:
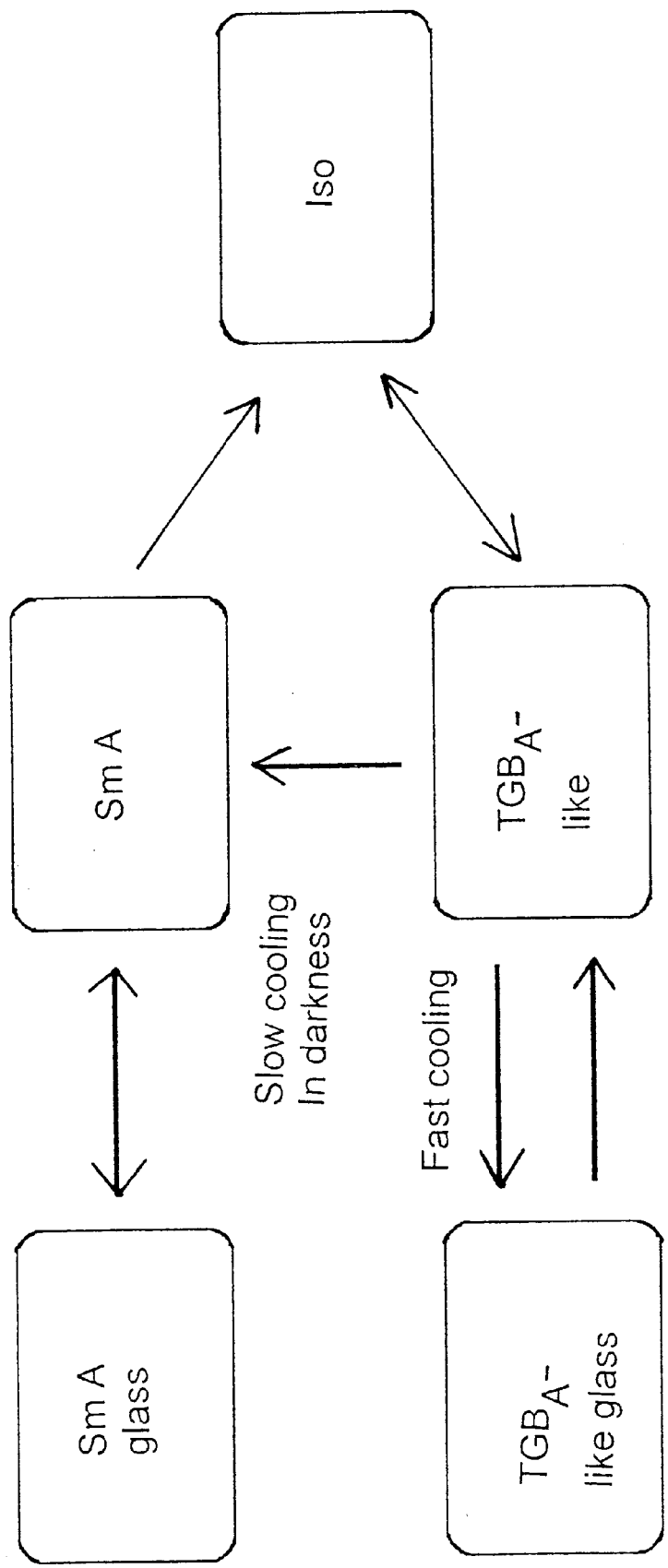
FIG. 6 shows a proposed scheme of phase transitions in the copolymer SK8.
Figure 14:
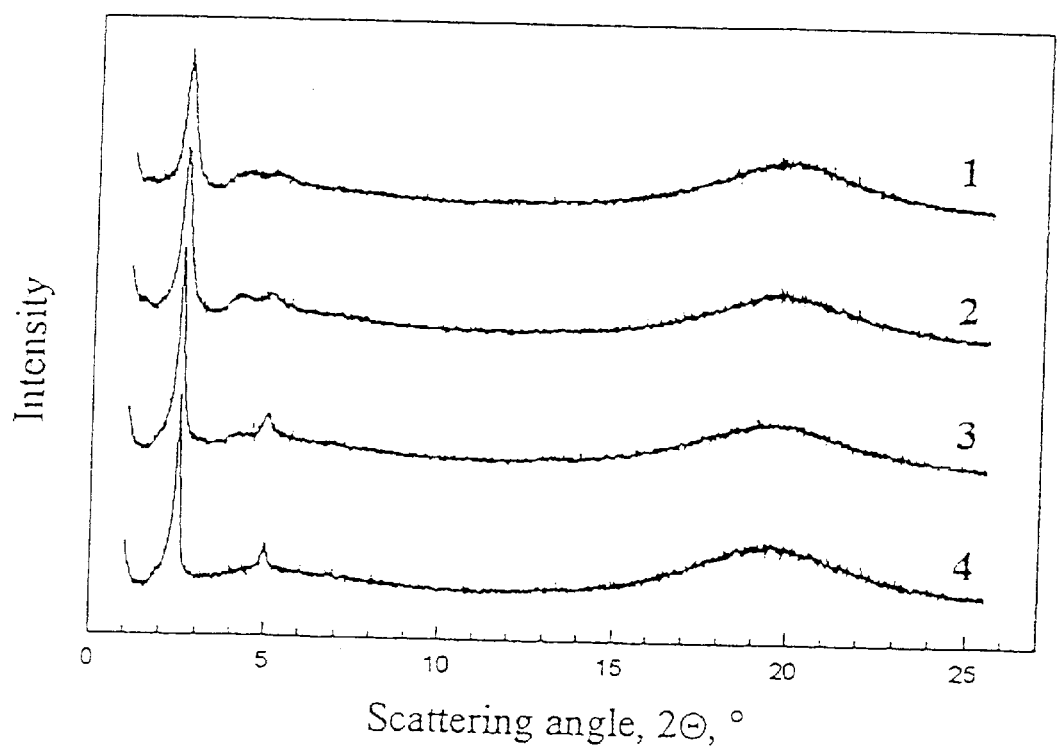
FIG. 14 shows X-ray curves from the copolymer SK28 in the Sm in the Sm $A^*$ phase. 1-at 20° C.; 2- at 35° C.; 3- at 50° C.; and 4- at 57° C.

The X-ray curves from the copolymer SK28 at various temperatures (FIG. 14) indicate however the coexistence of two different packings of the mesogenic side chains: the structure of FIG. 5A with d~69 Å, and a simple monolayer packing with d~36 Å (FIG. 5B) similar to the homopolymer SK100 [13]. The $d_1$ peak is rather wide at room temperature, probably due to the superposition of the second order reflex from the former lattice and the first one of the latter lattice. At higher temperatures it becomes narrow; the peak at θ~4.00 corresponding to the third order reflection from the Sm $A_d$ lattice ($d_2$~21 Å), disappears, and the peak at θ~5.0° corresponding to the second order reflection from the monolayer Sm A lattice ($d_3$~17 Å), grows, thus indicating shift of the equilibrium to the monolayer structure.

As seen from the FIG. 13, the layer thickness of either mesophase grows with the increasing proportion of azobenzene dye moieties; whereas for the copolymers SK8 and SK 16, the layer spacing in the Sm A* phase is somewhat shorter than in the TGB A* phase. This indicates a more dense packing of the smectic layers, i.e. deeper overlap of the chiral terminal fragments within the Sm A* phase, as compared with the TGB A* phase of the same polymer. That would explain also the increased intensity of the do peak, in relation to the $d_1$ peak, at the TGB A*—Sm A* transition (FIG. 2). For both mesophases, the total layer thickness of ~69 Å seems to be the maximum possible value for the structure of FIG. 6a: after reaching that critical dimension, the TGB A* phase ceases to exist at all (copolymer SK28), and the Sm A* phase changes for the monolayer structure (SK28 at higher temperatures and the homopolymer SK100 [13]).

In contrast, the packing of the mesogenic side chains within a smectic layer seems not to be affected by the TGB A*—Sm A* phase transition (FIG. 3B): the D values for the both mesophases follow the same straight line with increasing temperature.

Figure 7A:
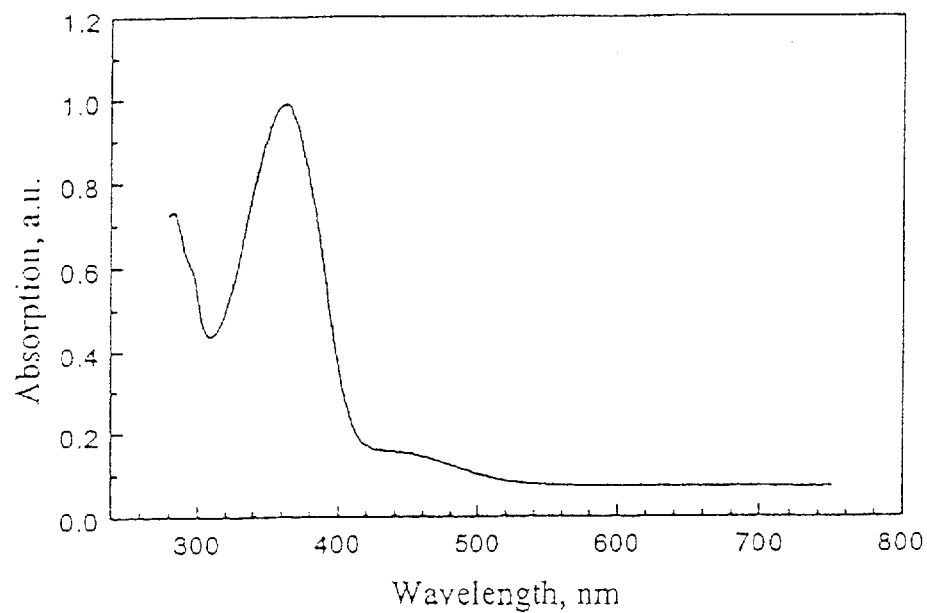
FIGS. 7A and 7B show absorption spectra of the copolymers: (A) SK28, chloroform solution; (B) copolymer films: 1-SK8, TGB $A^*$ phase at 28° C.; 2-SK8, Iso phase at 60° C.; 3-SK16, TGB $A^*$ phase at 28° C.; 4-SK16, Iso phase at 70° C.; 5-Sk28, Sm $A^*$ phase at 28° C.; 6-SK28, Iso phase at 80° C.

FIG. 7A shows the absorption spectra of SK28 in solution. The absorption is caused by azobenzene dye moieties and should not change qualitatively for other copolymers: the greenish blue 450 nm absorption band correspond to the absorption of the cis isomer, and the near UV 360 nm absorption band corresponds to the absorption of trans isomer. Absorption spectra of the copolymer films are presented in FIG. 7B. We should note here, that J. Wendorff and M. Eich [19] have reported similar curves for nonchiral copolyacrylate containing the same p-cyano-azobenzene chromophore groups.

Figure 7B:
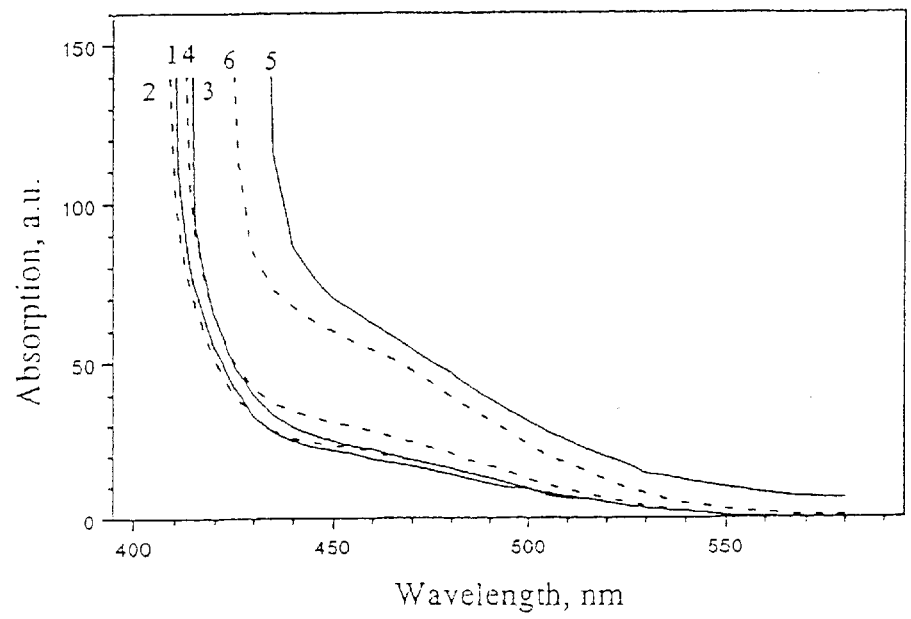

The data of FIG. 7B (curve 5) show prominent contribution of scattering from the Sm A* texture of SK28 copolymer, as compared with TGB A* phase of other polymers and with the isotropic melt of all copolymers. On the other hand, there is almost no difference in absorption between those two latter phases.

The helical superstructure of the TGB A* mesophase is confirmed by the CD spectra (FIG. 8).

The TGB A* phase shows ten times higher specific rotation than the Sm A* phase, where the circular dichroism is caused by molecular rotation only but not because of the helical superstructure. The effect is most pronounced close to the absorption band of the dye, $\lambda_{max}$=470 nm.

The inversion of the rotation sign has been observed at $\lambda_0$=380 run. So we can evaluate the helical pitch of the TGB A* phase for SK8 as $\lambda_0$/n~250 nm, The azobenzene dye fragments of the copolymers reveal the reversible cis-trans isomerization under illumination by TV light (trans to cis) or by visible light (cis to trans). Two mechanisms of photorecording are possible in the copolymers. The first one, i.e. the standard photo optical recording [8A], occurs due to creation of the photo induced birefringence in copolymer films, especially within the highly transparent, optically isotropic TGB A* phase.

Second, the light illumination during the cooling, also with nonpolarized white light or selectively at the wavelength range of the absorption band, 400–500 mn, can prevent the TGB A*—Sm A* transition in the copolymers SK8 and SK16.

A new series of chiral photo chromic side chain LC copolymethacrylates has been synthesized containing chiral mesogenic fragments and of photo chromic diazo moieties.

The copolymers form smectic phases of two types: a proper smectic phase, Sm A*, and an "isotropic smectic" phase, TGB A*. The copolymers SK8 and SK16 can form both mesophases, and any of those can be frozen in glass depending on cooling conditions. Structure of the mesophases has been studied and packing scheme of the mesogenic side chains in smectic layers has been suggested.

Absorption spectra of the "isotropic smectic" copolymer films have been studied, and circular dichroism measured.

Interrelated influence of temperature and light illumination on the phase state of the copolymer has been investigated.

It should be noted herein some advantages of the suggested photorecording principle.

The recording can be done with non-polarized white light of small intensity to 0.3 mW/cm$^2$ (no laser or UV lamp needed)

The recorded image can be easily read out with nonpolarized light

No film prealigrnment (electric field, polyimide orienting layer, surface rubbing, etc.) is required It has been observed the same photosensitive phase behaviour and photorecording capability for the copolymer SK16 with twice higher proportion of the dye component.

A new chiral photochromic side chain light control copolymethacrylate has been synthesized containing 84% of chiral mesogenic fragments and 16% of photochromic ones. The copolymer forms two smectic phases: a proper smectic phase, Sm A*, and an "isotropic smectic" phase, or a TGB$_A$-like amorphous phase; and either of those can be frozen in glass depending on cooling conditions. The structure of the mesophases has been studied and a packing scheme of the mesogenic side chains in the smectic layers has been suggested.

EXAMPLES 6–9

Another group of copolymers of the general formula above, wherein X is —O—, Z is —N=N—, and R, is —OCH$_3$ has been prepared in accordance with the table below, wherein the melting points of the copolymers are given.

| Example | Dye content, % | Tm, ° C. | Other transitions |
|---------|----------------|----------|-------------------|
| 6 | 6.5 | 71 | — |
| 7 | 19 | 73 | — |
| 8 | 29.5 | 79 | — |
| 9 | 41 | 76 | 22 (in cooling) |

It is not clear yet, if the copolymer according to Example 9 can form the "isotropic smectic phase" in darkness, but it certainly forms it under light irradiation using about 5 mW/cm$^2$. Optical properties of the "isotropic smectic" copolymer films have been studied, linear and circular dichroism has been measured, and order parameter of the dichroic dye moieties has been evaluated. The interrelated effects of temperature and light illumination on the phase state of the copolymer have been investigated.

A new approach to photorecording in photo chromic light control polymers has been suggested based on hindering the phase transition from the TGB$_A$-like phase to Sm A* phase in chiral copolymers by light illumination. A set-up for such a photorecording has been assembled and the first photo images have been recorded.

The present photorecording polymers can be used for photographing, data storage, signs, to mention a few of the different areas wherein the polymers can be used. The photo recorded text in the polymers can readily be erased by light or an electrical field, whereupon the polymer can be used again. Thus, e.g., signs can be easily redesigned to create new contents of an advertisement.

REFERENCES

1. McArdle C. B. (Ed.), 1982, *Applied Photochromic Polymer Systems*, London: Blackie.
2. Anderle, K., and Wendorff, J., 1994, *Mol. Cryst. Liq. Cryst.*, 243, 51
3. Shibaev, V. P., 1994, *Mol. Cryst. Liq. Cryst.*, 243, 201.
4. Ivanov, S. A., Yakovlev, I., Kostromin, S., Shibaev, V., Lasker, L., Stumpe, J., and Kreisig, D., 1991, *Makromol. Chem., Rapid Commun.*, 12, 709.
5. Shibaev, V. P., Kostromin, S. A., and Ivanov, S. A., 1996, in *Polymers as Electrooptical and Photooptical Active Media* (Ed. by V. P. Shibaev), Berlin: Springer, pp. 37–110.
6. Haase, W., and Bormuth, F. J., 1989, in *Polymers in Information Storage Technology* (Ed. K. L. Mittal), N.Y.—L.: Plenum Press, pp. 51–64.
7. Stumpe, J., Lasker, L., Fischer, Th., Kostromin, S., Ivanov, S., Shibaev, V., and Ruhmann, R., 1994, *Mol. Cryst. Liq. Cryst.*, 253, 1.
8. Nathanson, A., Rochon, P., Gosselin, J., and Xie, S., 1992, *Macromolecules*, 25, 2268.
9. Ichimura, K., 1996, *Supramolecular Science*, 3, 67.
10. Screrowsky, G., Beer, A., and Coles, H. J., 1991, *Liquid Crystals*, 10, 809.
11. Bata, L., Fodor-Csorba, K., Szabon, J., Kozlovsky, M. V., and Holly, S., 1991, *Ferroelectrics*, 122, 149.
12. Demikhov, E., and Kozlovsky, M. V., 1995, *Liquid crystals*, 18, 911.
13. Kostromin, S. G., Stakhanov, A. I., and Shibaev, V. P., 1996, *Polymer Science*, 38, 1030.
14. Fan, Z. X., and Haase, W., 1991, *J. Chem. Phys.*, 95,6066.
15. Goodby, S. W., Slaney, A. J., Booth, C. J., Nishiyama, I., Vuijk, J. D., Styring, P., and Toyne, J., 1994, *Mol. Cryst. Liq. Cryst.*, 243, 231.
16. Tsukruk, V. V., Shilov, V. V., Lokhonia, O. A., and Lipatov, Yu. S., 1987, *Sov. Phys. Crystallogr.*, 32, 88.
17. Tsukruk, V. V., Kozlovsky, M. V., Shilov, V. V., and Shibaev, V. P., 1988 *Sov .Phys. Crystallogr.*, 33, 423.
18. Goodby, J. W., Dunmur, D. A., and Collings, P. J., 1995, *Liquid Crystals*, 19, 703.
19. Wendorff, J. H., and Eich, M., 1989, *Mol. Cryst. Liq. Cryst.*, 169, 133.
20. Donald, A. M., and Windel, A. H., 1992, *Liquid Crystalline Polymers, Cambridge:* Cambridge University Press, p. 146.
21. Kozlovsky, M. V., Fodor-Csorba, K., Bata, L., and Shibaev, V. P., 1992, *Eur. Polym. J.*, 28, 901.
22. Kozlovsky, M. V., and Demikhov, E., 1996, *Mol. Cryst. Liq. Cryst.*, 282, 11.
23. Blinov, L. M., Kozlovsky, M. V., Nakayama, K., Ozaki, M., and Yoshino, K., *Jpn. J. Appl. Phys.*, 35, 5405 (1996)
24. Dinescu, L., and Lemieux, R. P., 1997, in *6th Int. Conf. on Ferroelectric Liquid Crystals*, Brest, France, Jul. 20–24, 1997, Abstracts, 175.
25. Kozlovsky, M. V., Shibaev, V. P., Stakhanov, A. I., Weyrauch, T., and Haase, W., 1997 (*Mol. Cryst. Liq. Cryst.*, in press)
26. Kozlovsky, M. V., Kononov, S. G., Blinov, L. M., Fodor-Csorba, K. and Bata, L., 1992 *Eur. Polym. J*, 28, 907

What is claimed is:

1. A photo recording polymer comprising polymethacrylate, and having the following general formula;

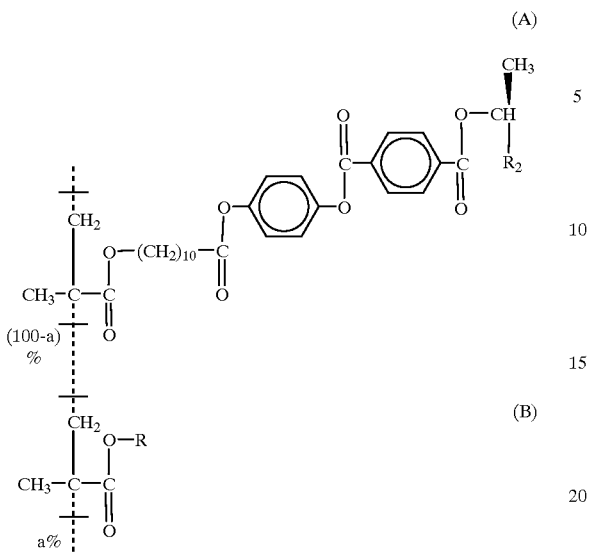

(A)

(B)

wherein R is —(CH$_2$)$_o$—X—C$_6$H$_4$—Z—C$_6$H$_4$—R$_1$, wherein R$_1$ is an electron acceptor, selected from the group consisting of cyano, alkoxy having 1 to 8 carbon atoms, halosubstituted alkoxy having 1 to 8 carbon atoms, F, Cl, hydroxy, esters of the formula —OOC—C$_n$H$_{2n-1}$, —CO—C$_n$H$_{2n-1}$, wherein n is 1 to 8, H, X is selected from the group consisting of —O—, and —COO—, Z is selected from the group consiting of —N=N—, —CH=N—, or —CH=CH—, wherein —CH= of the —CH=N— group is bound to the main part of the structure, R$_2$ is C$_m$H$_{2m+1}$, wherein m is an integer 4 to 7, o is a number of 7 to 12, and a is number providing for a photo chromic polymer.

2. Polymer according to claim 1, wherein R$_1$ is cyano, Z is —N=N—, and R$_2$ is C$_n$H$_{2m+1}$, wherein m is 6, and wherein B is present in an amount of 8–20 mol %.

3. Polymer according to claim 1, wherein R$_1$ is cyano, Z is —N=N—, and R$_2$ is C$_m$H$_{2m+1}$, wherein m is 4, 5, or 7, and wherein B is present in an amount of 8–20 mol %.

4. Polymer according to claim 1, wherein R$_1$ is alkoxy, Z is —N=N—, and R$_2$ is C$_m$H$_{2m+1}$, wherein m is 4 to 7, and wherein B is present in 35 to 80 mol %.

5. Polymer according to claim 1, wherein R$_1$ is acyl, Z is —N=N—, and R$_2$ is C$_m$H$_{2m+1}$, wherein m is 4 to 7, and wherein B is present in 35 to 80 mol %.

6. Polymer according to claim 1, wherein R$_1$ is a halogen, Z is —N=N—, and R$_2$ is C$_m$H$_{2m+1}$, wherein m is 4 to 7.

7. Polymer according to claim 1, wherein R$_1$ is a ketonic group having 4 to 6 carbon atoms, Z is —N=N—, and R$_2$ is C$_m$H$_{2m+1}$, wherein m is 4 to 7.

8. Polymer according to claim 1, wherein R$_1$ is an ester group having 4 to 6 carbon atoms, Z is —N=N—, and R$_2$ is C$_m$H$_{2m+1}$, wherein m is 4 to 7.

9. Polymer according to claim 1, wherein R$_1$ is hydroxy, Z is —N=N—, and R$_2$ is C$_m$H$_{2m+1}$, wherein m is 4 to 7.

10. Polymer according to claim 1, wherein R$_1$ is alkoxy having 1 to 8 carbon atoms, Z is —CH=N—, and R$_2$ is C$_m$H$_{2m+1}$, wherein m is 4 to 7.

11. Polymer according to claim 1, wherein R$_1$ is alkoxy having 1 to 8 carbon atoms, Z is —CH=CH—, and R$_2$ is C$_m$H$_{2m+1}$, wherein m is 4 to 7.

12. A photo recording polymer comprising polymethacrylate, and having the following general formula:

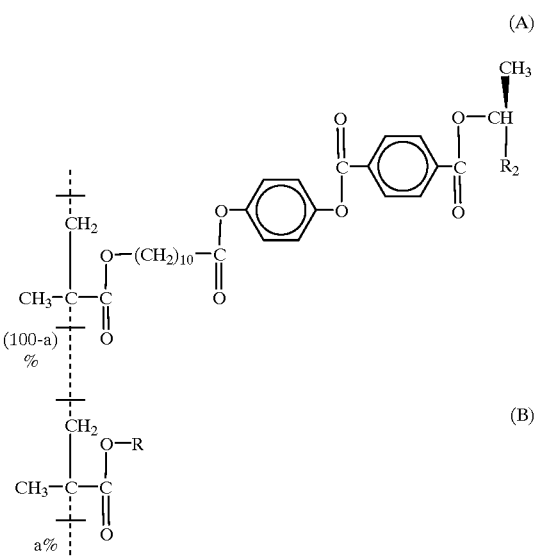

(A)

(B)

wherein R is —(CH$_2$)$_o$—X—C$_6$H$_4$—Z—C$_6$H$_4$—R$_1$, wherein R$_1$ is an electron acceptor, selected from cyano, alkoxy having 1 to 8 carbon atoms, halosubstituted alkoxy having 1 to 8 carbon atoms, halogen (F, Cl), hydroxy, esters of the formula —OOC—C$_n$H$_{2n-1}$, —CO—C$_n$H$_{2n-1}$, wherein n is 1 to 8, but excluding nitro, Br, I, and —SO$_3$H, X is selected from the group consisting of —O—, and —COO—, Z is selected from the group consiting of —N=N—, —CH=N—, or —CH=CH—, wherein —CH= of the —CH=N— group is bound to the main part of the structure, R$_2$ is C$_m$H$_{2m+1}$, wherein mn is an integer 4 to 7, o is a number of 7 to 12, and a is number providing for a photo chromic polymer, excluding the polymers wherein R$_1$ is cyano, Z is —N=N—, and R$_2$ is C$_m$H$_{2m+1}$, wherein mn is 6, and wherein B is present in an amount of 8 mol %.

13. A photorecording medium formed from a photochromic polymer comprising a polymer backbone with mesogenic and photochromic dye side chains, wherein the dye side chains are in an isoptropic smetic phase.

14. A photorecording media using a copolymer according to any one of claims 1–12 in its isotropic smectic phase.

15. A method for recording information on a polymeric medium, comprising the steps of:

(a) providing a photo recording polymer comprising substituted polymethylinethacrylatc, and having the following general formula:

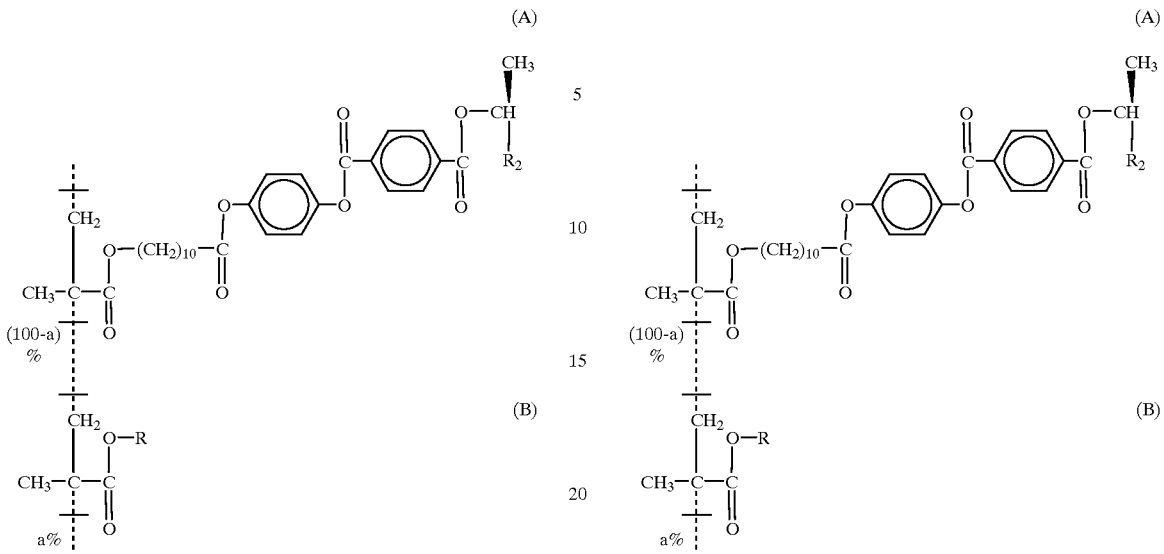

wherein R is —$(CH_2)_o$—X—$C_6H_4$—Z—$C_6H_4$—$R_1$, wherein $R_1$ is an electron acceptor selected from the group consisting of cyano, alkoxy having 1 to 8 carbon atoms, halosubstituted alkoxy having 1 to 8 carbon atoms, F, Cl, hydroxy, esters of the formula —OOC—$C_nH_{2n+1}$, —CO—$C_nH_{2n+1}$, wherein n is 1 to 8, X is selected from the group consisting of —O—, and —COO—, Z is selected from the group consisting of —N=N—, —CH=N, and —CH=CH—, wherein —CH= of the =CH=N— group if present, is bound to the main part of the structure, $R_2$ is $C_mH_{2m+1}$, wherein m is an integer from 4 to 7, o is a number from 7 to 12, and a is a number providing for a photochromic polymer; and (b) recording information on the polymeric medium using non-polarized, visible, low-energy light.

16. A method for recording information on a polymeric medium, comprising the steps of:

(a) providing a photo recording polymer comprising substituted polymethylmethacrylate, and having the following general formula:

wherein R is —$(CH_2)_6$—X—$C_6H_4$—Z—$C_6H_4$—$R_1$, wherein $R_1$ is an electron acceptor selected from the group consisting of cyano, alkoxy having 1 to 8 carbon atoms, halosubstituted alkoxy having 1 to 8 carbon atoms, F, Cl, hydroxy, esters of the formula —OOC—$C_nH_{2n+1}$, —CO—$C_nH_{2n+1}$, wherein n is 1 to 8, X is selected from the group consisting of —O—, and —COO—, Z is selected from the group consisting of —N=N—, —CH=N, and —CH=CH—, wherein —CH= of the =CH=N— group, if present, is bound to the main part of the structure, $R_2$ is $C_mH_{2m+1}$, wherein m is an integer from 4 to 7, o is a number from 7 to 12, and a is a number providing for a photochromic polymer; and (b) recording information on the polymeric medium using polarized, low energy light.

17. The polymer of claim 1, wherein n is from 4 to 6.

18. The polymer of claim 17, wherein o is 10.

19. The polymer of claim 17, wherein o is 10.

20. The method of claim 15, wherein n is from 4 to 6.

* * * * *